United States Patent
Lyons et al.

(10) Patent No.: US 7,805,343 B1
(45) Date of Patent: Sep. 28, 2010

(54) METHOD AND APPARATUS FOR MANAGING TAX RETURN PREPARATION

(75) Inventors: Zachary B. Lyons, San Diego, CA (US); Michael J. Maron, San Diego, CA (US); Richard S. Davis, San Diego, CA (US); Qwan T. Pham, San Diego, CA (US); Christopher D. Nesladek, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 788 days.

(21) Appl. No.: 11/208,507

(22) Filed: Aug. 22, 2005

(51) Int. Cl.
*G06F 17/22* (2006.01)
*G07F 19/00* (2006.01)

(52) U.S. Cl. ...................................................... 705/31

(58) Field of Classification Search ................. 705/31
See application file for complete search history.

(56) References Cited

U.S. PATENT DOCUMENTS

| | | | |
|---|---|---|---|
| 5,671,363 A * | 9/1997 | Cristofich et al. ............ | 705/37 |
| 5,946,669 A * | 8/1999 | Polk ............................ | 705/40 |
| 6,202,052 B1 * | 3/2001 | Miller ......................... | 705/31 |
| 2001/0037268 A1 * | 11/2001 | Miller ......................... | 705/31 |
| 2002/0111888 A1 * | 8/2002 | Stanley et al. ................ | 705/31 |
| 2002/0173934 A1 * | 11/2002 | Potenza ..................... | 702/182 |
| 2003/0018558 A1 * | 1/2003 | Heffner et al. ............... | 705/37 |
| 2004/0083145 A1 * | 4/2004 | Kobayashi et al. ........... | 705/31 |
| 2004/0205008 A1 * | 10/2004 | Haynie et al. ................ | 705/31 |
| 2005/0038722 A1 * | 2/2005 | Throndson et al. ........... | 705/31 |
| 2006/0085303 A1 * | 4/2006 | Reeb ........................... | 705/31 |
| 2007/0203815 A1 * | 8/2007 | Maegerlein ................. | 705/31 |

* cited by examiner

*Primary Examiner*—Matthew S Gart
*Assistant Examiner*—Ig T An
(74) *Attorney, Agent, or Firm*—Osha • Liang LLP

(57) ABSTRACT

A method for managing tax return preparation includes receiving employee first information from a first company on behalf of a first employee, and preparing a tax return using the employee first information. The method further includes access to the tax return being provided to the employee. When the employee is satisfied, authorization is received to file the tax return on behalf of the employee and the tax return is filed with a tax authority.

20 Claims, 3 Drawing Sheets

METHOD AND APPARATUS FOR MANAGING TAX RETURN PREPARATION

BACKGROUND

Tax returns are required by taxing authorities such as the United States Internal Revenue Service, and various State taxing authorities. To properly file a tax return, a taxpayer typically has to determine which tax forms to file, and then prepare and file those tax forms. The task of determining which tax forms to file may vary in complexity, depending on the financial situation of the taxpayer.

Younger taxpayers typically have less complex financial situations than older taxpayers, and therefore typically have fewer tax forms to prepare and file. However, in addition to having a less complex financial situation, those younger taxpayers typically have less experience interacting with the tax authority and therefore are less educated about the process, various deadlines that may be involved, and the information needed to prepare a proper tax return.

SUMMARY

A method for managing tax return preparation includes forming an agreement by a company with a tax preparation entity to provide tax preparation services for its employees. Authorization is received from an employee of the company to provide employee personal information to the tax preparation entity following which employee personal information is provided to the tax preparation entity for the purpose of preparing a tax return for the employee.

A method for managing tax return preparation includes receiving employee first information from a first company on behalf of a first employee, and preparing a draft tax return using the employee first information. The method further includes access to the draft tax return being provided to the employee. When the employee is satisfied, the draft return is finalized, resulting in an approved tax return. Authorization is received to file the approved tax return on behalf of the employee and the approved tax return is filed with a tax authority.

Other aspects and advantages of the invention will be apparent from the following description and the appended claims.

DETAILED DESCRIPTION

Figure 1:
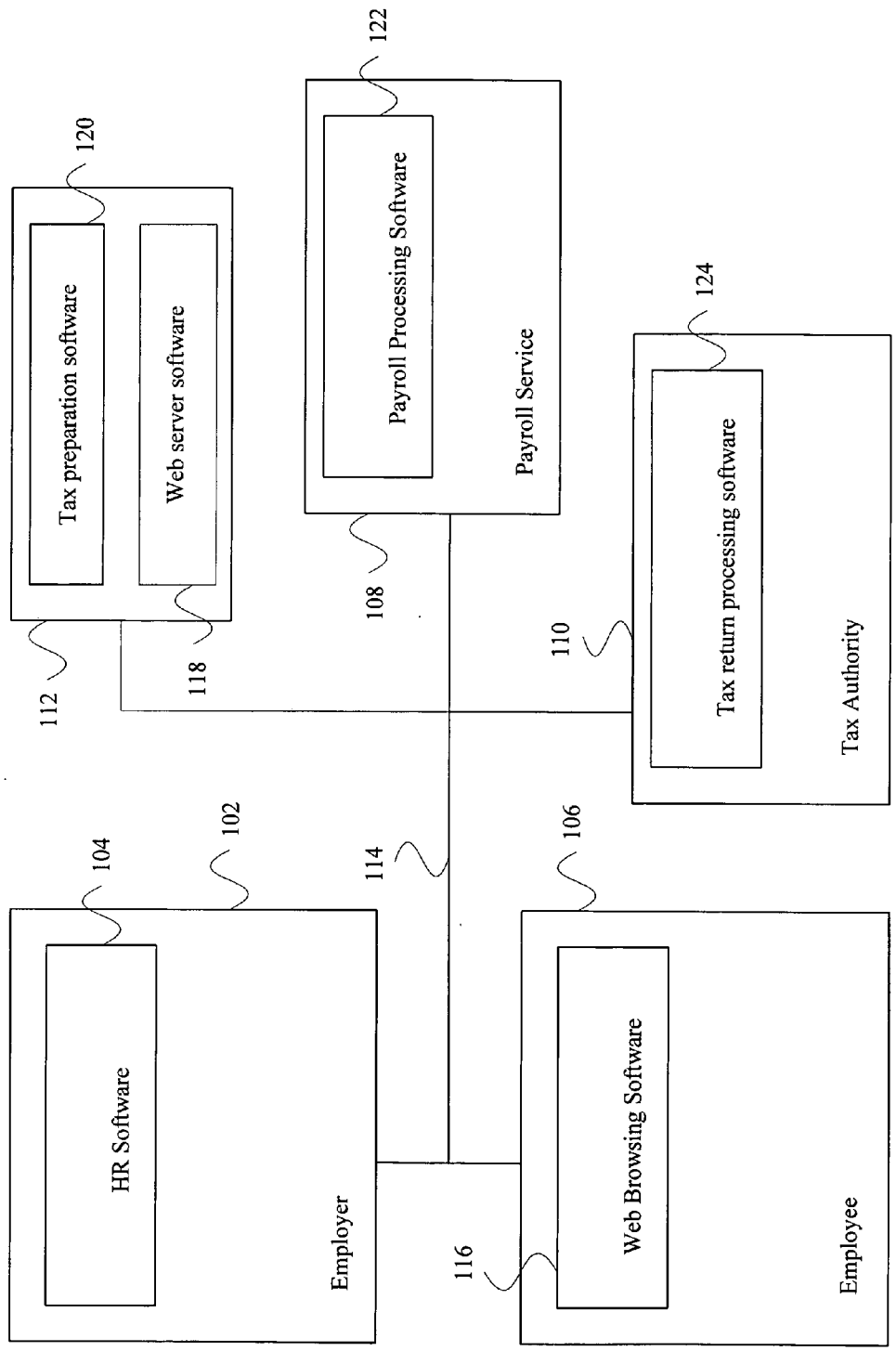
FIG. 1 shows a block diagram according to one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for managing the preparation and filing of a tax return.

In one or more embodiments of the invention an employer creates a tax return preparation benefit through collaboration with a tax preparation entity and other optional business entities. Further, the employer arranges for the tax preparation entity to prepare and file one or more tax returns on behalf of interested employees using information provided by the employer or other person or business entity. The employer or other person or business entity also manages acquiring any required employee information that is additional to the data the employer already has acquired through its normal business practices.

Further, the employer or other person or business entity also coordinates receiving the proper authorizations from interested employees so that the employer and its representatives are allowed to provide payroll and other data to the tax preparation entity, as necessary to facilitate the preparation and filing of the tax return. In one or more embodiments of the invention, coordination is accomplished by an entity involved with any of the data collection or tax return preparation processes including the provider of data used in the preparation of the return, the tax return preparer, the employee, etc.

Interested employees may be identified at any time. In one or more embodiments of the invention, employees are notified of the existence of the tax return benefit during the hiring process. In one or more embodiments of the invention, interested employees indicate their interest after the hiring process is complete, at some point during the term of their employment. In one or more embodiments of the invention, there is a blackout time period during an initial period of the employment period of a new employee during which the new employee is not able to use or take advantage of the benefit, but after which the new employee may use or take advantage of the benefit, etc. In one or more embodiments of the invention, a blackout period exists, and a new employee may indicate interest at the beginning of or during the blackout period, even though the employer doesn't provide the benefit to the new employee until after the blackout period terminates.

During a given tax year, payroll and other information is routinely prepared and stored by or on behalf of the employer, according to normal business practices, for end of year tax reporting purposes as required by law, and for other purposes. In one or more embodiments of the present invention, a payroll service company operating on behalf of the employer generates and collects payroll information associated with the employee and provides that payroll information at an appropriate time directly to the tax preparation entity.

Alternatively, according to one or more embodiments of the invention, payroll information collected by a payroll service company on the behalf of the employer is provided to a third party such as the employer, another person, or other business entity who provides portions of that payroll information to the tax preparation entity, as needed for the preparation and filing of the tax return. For these purposes, a portion is any part of the data from less than one percent to 100 percent, or the entirety of the data. Other providers such as, retail and wholesale product, medical service and product providers, mortgage companies, banks, stock brokers and the like may also provide data into the tax preparation process as necessary.

Using payroll information together with other information provided by the employee or other providers or other persons involved in data generation, data collection, or tax return preparation processes, a draft tax return is provided by the tax preparation entity to the employee for review, editing, and approval for filing, as necessary.

In one or more embodiments of the invention, the employee receives the draft tax return in human readable format, through electronic mail, postal service mail, or through other communication means known to persons of ordinary skill in the art. Human readable format typically refers to the data as it is displayed, rather than how that data is stored. Persons of ordinary skill in the art having the benefit of this disclosure will readily realize that many document formats common to the computing field are human readable. By way of example, portable document format (pdf) files, Word document (doc) files, excel spreadsheet files, tax preparation software files, etc., are all able to be displayed in human readable form using software designed for the particular file format involved.

Receipt of the draft tax return by the employee may take place in any way known to persons of ordinary skill in the art, such as electronically, or through a paper version delivered to the employee through the postal system, by courier, etc. In one or more embodiments of the invention, the draft tax return is provided through electronic messaging such as electronic mail, a peer-to-peer system, an instant messaging system, etc. In one or more embodiments of the invention, the draft return is stored on a server provided for that purpose, and a network link to the draft tax return is sent to the employee with other optional information that may be needed to access the draft tax return. Such a link may include data which, when provided to a database at a server having the stored draft tax return, causes the database to locate, retrieve and provide the data file over a communication means to the employee. In one or more embodiments of the invention, the employee is provided with a uniform resource locator (URL) optionally including database retrieval information and indicating where the draft return may be accessed, optionally with other data such as a username and password.

Changes to the tax return, if necessary, may be made in a variety of ways, depending on how access to the tax return is provided. As an example, in one or more embodiments of the invention, access to the return is provided through an attachment received by the taxpayer through email. In one or more embodiments of the invention, the attachment is readable by tax preparation software such as Turbotax™, Taxcut, TaxAct, Visual Tax, UltraTax, CorpTax, Taxworks, or other software able to open an electronic file and allow a user to edit a file, such as Excel, Word, Acrobat, OpenOffice, StarOffice. Other such tax preparation and editing software may be known to persons of ordinary skill in the art. In one example, changes to that draft tax return are made directly into a master file representing the draft tax return. In one or more embodiments of the invention, access to the draft tax return is provided through a network address, and software present either on the server at the network address (e.g. software 120 of FIG. 1) or on a computer having access to the server at the network address facilitates receiving any changes provided by or on behalf of the taxpayer and either incorporating those changes into the master file representing the draft tax return or replacing the master draft tax return file with the data received back from the taxpayer, as necessary.

Following review, editing and final approval of the draft tax return by the employee, the finalized tax return is filed with the appropriate tax authority. In one or more embodiments of the invention, the finalized tax return is electronically filed with the appropriate tax authority, using a computer system coupled to a network such as the Internet, a local area network, a wide area network, a combination of different networks, or using another electronic filing apparatus facilitating the electronic transmission and receipt of data.

Information such as tax return information, corrections, modifications, and approvals of tax returns may be transmitted to, from, or through such a network over wires, wirelessly, or both, depending on the design of the system being employed. Such a network may be used, among other things, to facilitate communication between two or more computer systems involved with the preparation, approval and filing of the tax return.

Communication between the various entities discussed in this disclosure may take place using any reasonable electronic or nonelectronic method, and is therefore not limited to communicating using computer systems and networks. Further, communication may take place using wired networks, wireless networks, or any other medium known to persons of ordinary skill.

The tax return is filed with a tax authority such as the Internal Revenue Service or other federal government tax authority, or state or local government tax authority.

In this specification, it is intended that the term "coupled" describe devices which interact with each other, directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

FIG. 1 shows a block diagram of a computer system according to one or more embodiments of the invention.

Employer computing system 102 executes Human Relations (HR) software 104 designed to facilitate the collection, storage and retrieval of employee information for business purposes, such as for human relations tasks. Such information may include, but is not limited to, contact information such as name, address, and telephone number, payroll amounts, one or more of Federal, state or local taxes withholding data, etc.

If payroll processing or other tax related operations are accomplished on employer computing system 102, HR software 104 optionally includes appropriate functionality to accomplish those operations. HR software 104 may be a single application, or may instead include multiple applications having the desired functionality. Employer computing system 102 may be a standalone computing system, be a single computer coupled to a network, or may be a server coupled to a network.

Computing systems such as employee computing system 106, payroll service computing system 108, tax authority computing system 110, and tax preparer computing system 112 are coupled to employer computing system 102 through transmission lines 114. Persons of ordinary skill in the art will readily recognize that there may be devices disposed between one or more of employer computing system 102, employee computing system 106, payroll service computing system 108, tax authority computing system 110, and tax preparer computing system 112 to facilitate network communication. However, because those devices provide networking functions which are not the primary focus of the invention, those devices are not described herein, to avoid overcomplicating this disclosure.

Employee computing system 106 has web browsing software 116 executing thereon which allows a user of employee computing system 106 to view network information provided by one or more computing systems using a web server or other information delivery mechanism, such as information which may be provided by tax preparer computing system 112.

Such information is made available through web server software 118 which is optionally executing on tax preparer computing system 112, or may alternatively be made available through functionality which is included in tax preparation software 120 executing on tax preparer computing system 112. Persons of ordinary skill in the art having the benefit of this disclosure will readily recognize how to set up and manage a computing system such as tax preparer computer system 112 providing information to be viewed using web browsing software 116.

Payroll service computing system 108 represents a computing system operating at a payroll processing company which performs payroll processing services for business entities. Those payroll processing services are made efficient through the use of payroll processing software 122 which may be executing on payroll service computing system 108. Optionally, payroll processing software 122 includes networking functionality to enable communication with one or more other computing systems such as employer computing system 102, employee computing system 106, tax authority computing system 110, and tax preparer computing system 112 as needed.

Other business entities may be directly involved with the tax return preparation process, including data providers such as medical service providers, mortgage companies, investing services, etc. Those business entities may also have computing systems coupled to transmission lines 114 which enables those computing systems to electronically communicate with other computing systems such as employer computing system 102 employee computing system 106, and tax preparer computing system 112. Those business entities may also communicate with the employer, tax preparation entities, data providers, etc., using non-electronic means, in order to facilitate the tax return preparation process.

Tax authority computing system 110 represents a computing system at a tax authority that is optionally functioning to receive and process tax returns received at the tax authority. Such a tax authority computing system 110 will typically include tax return processing software 124 for processing incoming tax return data. If desired, tax return processing software 124 includes functionality to receive tax return information electronically, from one or more computing systems such as computing systems as employer computing system 102, employee computing system 106, and tax preparer computing system 112.

Persons of ordinary skill in the art are readily aware that tax returns are used to reconcile tax liability with a tax authority. Tax authorities include, but are not limited to, the United States Internal Revenue Service, the California Franchise Tax Board, other state and local tax authorities, etc.

Figure 2:
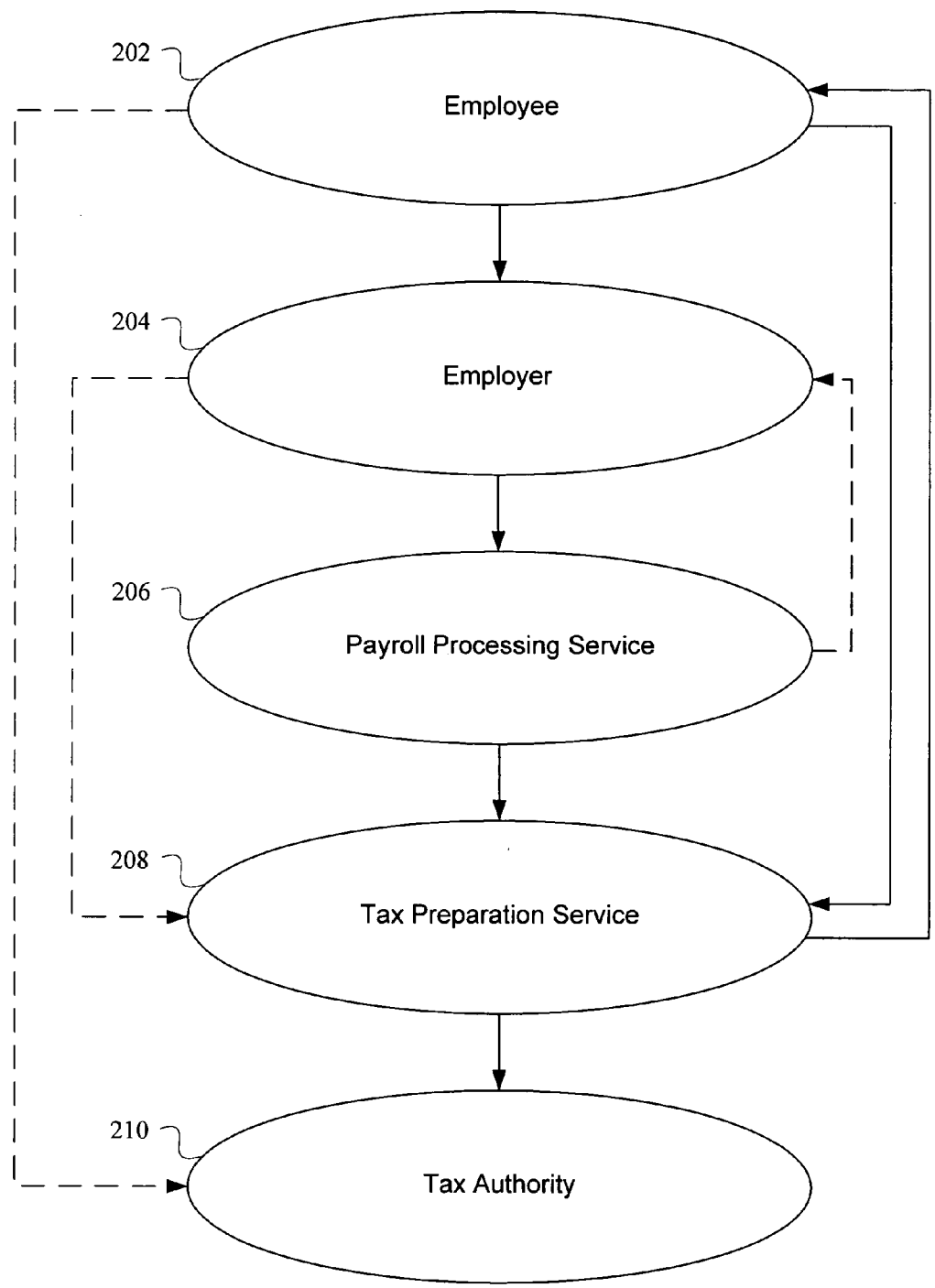
FIG. 2 is a dataflow diagram of a tax refund process according to one or more embodiments of the invention.

FIG. 2 is an information flow diagram of a tax return preparation process according to one or more embodiments of the invention.

Within FIG. 2, information pathways are shown using solid lines and dotted lines. The dotted lines reflect an information flow that is alternative to part of the information flow depicted using solid lines. Therefore, part of the flow shown using solid lines may be performed according to the flow depicted as dotted lines.

An employee 202 provides personal information to employer 204. This personal information may be used within the employer 204, and is also transmitted in full or in part as necessary, with proper authorization, to a payroll processing service 206, for use with payroll processing services. Personal information provided by employee 202 to employer 204 may include, and is not limited to the name of the employee, a contact address for the employee, the number of dependants associated with the employee, information relating to ownership by the employee of at least one asset affecting the tax return, and the marital status of the employee.

In one or more embodiments of the invention, payroll processing service 206, with proper authorization, provides payroll and other optional information to tax preparation service 208 directly. Such information may include, but is not limited to the name and address of the employee, the amount of wages paid to the employee in one or more categories e.g. Social Security Wages, Federal Taxable Wages, Medicare Wages, Federal Income Tax paid, state income tax paid, amounts deducted for social security, state income taxes withheld in one or more categories, retirement plan contributions, and health insurance premiums paid.

In one or more embodiments of the invention, payroll processing service 206 provides the information to employer 204 who optionally provides that information together with other information, to tax preparation service 208. If employer 204 doesn't use a payroll processing service 206 and therefore provides that functionality themselves, employer 204 will have direct or indirect access to the information described above previously described with respect to payroll processing service 206. In one or more embodiments of the invention, employer 204 provides this information, to tax preparation service 208 directly, or through a third party, depending on the business practices of employer 204.

At some point during the process of preparing a tax return by tax return preparation service 208, employee 202 may be asked to provide information to either confirm information already provided by either employer 204 or payroll processing service 206, or to enhance the information provided by employer 204 or payroll processing service 206. In one or more embodiments of the invention, employee 202 provides information to tax preparation service 208 that is relevant to the preparation of the tax return.

At some point following the receipt of enough information to prepare a tax return for employee 202, tax preparation service 208 prepares a draft tax return for review, editing and approval by employee 202 as necessary. As previously discussed, the tax return is provided to employee 202 using one or more alternatives such as providing a network link to a remote tax return file on a server, or sending an attachment representing the tax return to employee 202.

Once the tax return has been provided to employee 202, any necessary editing takes place in order to finalize the tax return for filing with tax authority 210. As previously discussed, changes to the tax return, if necessary, are made in a variety of ways, depending on how access to the tax return is provided.

As an example, in one or more embodiments of the invention, when access to the return is provided through an attachment readable by tax preparation software, the attachment may be saved and then opened, or may be opened directly, and changes to that draft return may then be made using software such as tax preparation software.

In one or more embodiments or the invention, when access to the return is provided through a network address, software present on the server at the network address such as tax preparation software 120 or web server software 118 facilitates receiving any changes provided on behalf of the taxpayer and incorporating those changes into the tax return.

Following review, editing and final approval as needed, the tax preparation service files the tax return with the appropriate tax authority. In one or more embodiments of the invention, the tax return is filed electronically using a computer system coupled to a network such as previously described.

In one or more embodiments of the invention, if the tax return is provided to employee 202 through electronic mail as an attachment, employee 202 makes any necessary changes to the tax return file on a computing system such as employee computing system 106 of FIG. 1, and either files the tax return directly with the tax authority, or instructs and authorizes tax preparation service 208 to file the tax return.

Figure 3:
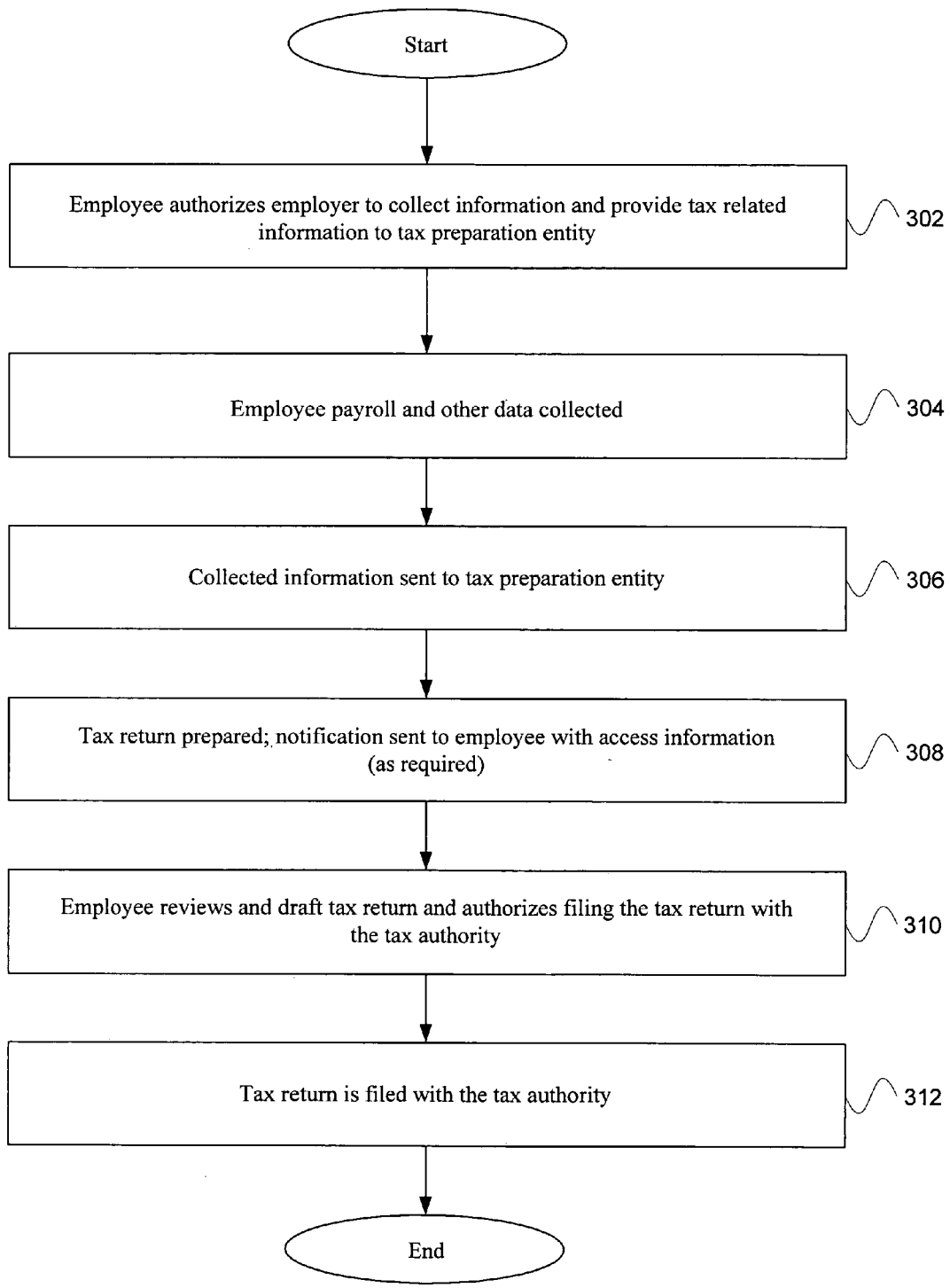
FIG. 3 shows a flowchart of a method according to one or more embodiments of the present invention.

FIG. 3 shows a flowchart of a method according to one or more embodiments of the present invention.

At 302, the employee authorizes and arranges with the employer to collect personal information about the employee that will later be provided to a tax preparation entity for the purpose of preparing a tax return for the employee. Persons of ordinary skill in the art having the benefit of this disclosure will readily recognize that the employer will often already have permission to use employee personal information in normal business practices related to the employment of the employee. Further, such authorization may be required for the employer to allow third parties providing services (e.g. payroll services) to provide information those third parties may have to others, for the purpose of preparing and filing a tax return.

At 304, payroll and other data is collected by or on behalf of the employer in order to further the goal of preparing a tax return for the employee at the end of the tax year.

At 306, information that has been collected is sent to the tax preparation entity, either directly by the employer, through a third party such as a payroll processing service associated with the employer, or by the employee.

At 308, a draft tax return is prepared using the information provided earlier. The draft tax return is then made available to the employee with any access information that may be required. Persons of ordinary skill in the art having the benefit of this disclosure will readily recognize many ways to provide the employee with access to the draft tax return. By way of example, tax software such as tax preparation software 120 of FIG. 1 may interact with web server software 118 to provide network access to the draft tax return. Alternatively, tax preparation software 120 may include built-in functionality to provide network access to the draft tax return including programming logic that may be necessary to edit and finalize the tax return.

At 310, the employee reviews the draft tax return and makes any changes that may be necessary, and authorizes the filing of the tax return. In one or more embodiments of the invention, review of the tax return takes place using software provided to the employee, such as review and editing software having functionality specifically directed to review and editing, or through other software such as tax preparation software known to those of ordinary skill.

At 312, once the employee is satisfied that the tax return is ready for filing, the employee authorizes the filing. In one or more embodiments of the invention, the employee authorizes, at 310, filing through a user interface built into software provided to the employee. Once filing is authorized, the tax return prints together with instructions for the employee to file the return with the tax authority. In one or more embodiments of the invention, the employee has performed one or more tasks such as reviewing, editing, and finalizing the draft tax return using a network browser such as a web browser and authorizes the tax preparation filing the tax return using that web browser. Once the authorization is received by the tax preparation entity, the tax preparation entity files the tax return with the tax authority.

Computer code implementing the methods presented in this disclosure may be stored in memory within a computer, or alternatively stored in more permanent computer readable medium such as hard drives, optical disks, compact disks, and magnetic tape. Further, such code may be transferred over communications networks with or without a carrier wave.

Although examples of embodiments have been presented in this disclosure wherein a computer implements methods to electronically file a tax return, and a different computer receives a refund electronically at a bank or other institution, and divides that refund into one or more portions for distribution, persons of ordinary skill in the art having the benefit of this disclosure will be readily aware that the present invention may be performed on a computer, or may instead be performed manually. Alternatively, portions of the invention may be performed on a computing system, while prior portions are performed without using a computer system.

Further, software instructions to perform embodiments of the invention may be stored on a computer readable medium such as a flash memory, compact disc (CD), hard disk drive, diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing tax return preparation using a tax preparer, the method comprising:

receiving, using a computer, a selection by a first employer, wherein the tax preparer is selected by the first employer to prepare a tax return for an employee of the first employer, wherein the employee authorizes the first employer to provide employee first information to the tax preparer to facilitate preparation of the tax return by the tax preparer on behalf of the employee;

coordinating, using the computer, with the first employer to receive the employee first information associated with the employee of the first employer, wherein the first employer determines when to send the employee first information to the tax preparer;

receiving, using the computer, the employee first information from the first employer on behalf of the employee, wherein the first employer is one selected from a group consisting of an employer of the employee, a payroll processing company, a payroll service company, a medical service provider, a medical product provider, a mortgage service company, and a financial services company;

preparing the tax return using the employee first information received from the first employer;

providing access to the tax return by the employee by sending the employee an electronic message comprising an attachment comprising the tax return in a form readable by tax preparation software provided to the employee;

receiving an updated tax return from the employee, wherein the updated tax return is generated based on the tax return by the tax preparation software;

receiving authorization to file the updated tax return on behalf of the employee; and in response to the authorization, filing the updated tax return with a tax authority.

2. The method of claim 1, wherein the first employer is the payroll service company and the employee first information comprises payroll data relating to the employee.

3. The method of claim 1, further comprising:
receiving employee second information from a second employer on behalf of the employee, wherein preparing the tax return comprises using the employee second information received from the second employer.

4. The method of claim 3, wherein the second employer is different from the first employer and is one selected from the group consisting of the employer of the employee, the payroll service company, the payroll processing company, the medical service provider, the medical product provider, the mortgage service company, and the financial services company.

5. The method of claim 1, wherein the employee first information comprises personal nonpayroll information and payroll information.

6. The method of claim 1, wherein the electronic message comprises at least one selected from a group consisting of an electronic mail message, an instant message, and a peer-to-peer message.

7. The method of claim 1, wherein providing access to the tax return comprises:
sending an electronic email message to the employee, the electronic mail message having an attachment comprising the tax return in human readable form.

8. The method of claim 1, wherein access to the tax return is provided through a web interface, and wherein authorization to file the tax return is received from the user through the web interface.

9. The method of claim 8, wherein the web interface is accessed wirelessly.

10. A computer readable storage medium having executable instructions stored thereon for executing a method comprising:
receiving a selection by a first employer, wherein a tax preparer is selected by the first employer to prepare a tax return for an employee of the first employer, wherein the employee authorizes the first employer to facilitate preparation of the tax return by the tax preparer on behalf of the employee;
coordinating with the first employer to receive employee first information associated with the employee of the first employer, wherein the first employer determines when to send the employee first information to the tax preparer;
receiving the employee first information from a first employer on behalf of a first employee;
preparing the tax return using the employee first information received from the first employer;
providing access to the tax return by the employee by sending the employee an electronic message comprising an attachment comprising the tax return in a form readable by tax preparation software provided to the employee;
receiving an updated tax return from the employee, wherein the updated tax return is generated based on the tax return by the tax preparation software;
receiving authorization to file the updated tax return on behalf of the employee; and
in response to the authorization, filing the updated tax return with a tax authority.

11. The computer readable storage medium of claim 10, wherein the first employer is a payroll processing company providing payroll services on behalf of an employer employing the employee.

12. The computer readable storage medium of claim 10, wherein the first employer is a payroll service company performing services for the first employer, and the employee first information comprises payroll data relating to the employee.

13. The method of claim 3, wherein preparing the tax return further comprises using the employee second information.

14. The computer readable storage medium of claim 10, further comprising:
receiving employee second information from a second employer on behalf of the employee.

15. The computer readable storage medium of claim 14, wherein preparing the tax return further comprises using the employee second information.

16. The computer readable storage medium of claim 10, wherein the employee first information comprises personal nonpayroll information and payroll information.

17. The computer readable storage medium of claim 10, wherein providing access to the tax return comprises:
sending an electronic email message to the employee, the electronic mail message having an attachment comprising the tax return in human readable form.

18. The computer readable storage medium of claim 10, wherein access to the tax return is provided through a web interface, and wherein authorization to file the tax return is received from the user through the web interface.

19. The computer readable storage medium of claim 18, wherein the web interface is accessed wirelessly.

20. The computer readable storage medium of claim 10, wherein the first employer is one selected from a group consisting of an employer of the employee, a payroll processing company, a payroll service company, a medical service provider, a medical product provider, a mortgage service company, and a financial services company.

* * * * *